United States Patent [19]
Faulkner

[11] Patent Number: 6,142,807
[45] Date of Patent: Nov. 7, 2000

[54] HIGH CURRENT AND LOW CURRENT ELECTRICAL BUSWAY SYSTEMS HAVING COMPATIBLE BUS PLUG

[75] Inventor: Nathan H. Faulkner, Pauline, S.C.

[73] Assignee: Siemens Energy & Automation, Inc., Alpharetta, Ga.

[21] Appl. No.: 09/165,695

[22] Filed: Oct. 2, 1998

[51] Int. Cl.⁷ .................................................. H01R 4/60
[52] U.S. Cl. ........................................ 439/212; 174/68.2
[58] Field of Search .................................... 439/211, 212, 439/138, 207, 686, 733, 215; 174/49, 68.2, 67

[56] References Cited

U.S. PATENT DOCUMENTS

| | | |
|---|---|---|
| 1,574,993 | 3/1926 | Miner . |
| 2,059,988 | 11/1936 | Frank ............................................ 247/3 |
| 2,888,529 | 5/1959 | Platz ............................................ 200/50 |
| 2,984,769 | 5/1961 | Turton ........................................ 317/120 |
| 3,018,320 | 1/1962 | Rowe ........................................... 174/99 |
| 3,052,769 | 9/1962 | Kuhar et al. ................................ 200/51 |
| 3,072,736 | 1/1963 | Wallace ....................................... 174/99 |
| 3,088,994 | 5/1963 | Cataldo ........................................ 174/99 |
| 3,113,820 | 12/1963 | Norden . |
| 3,209,301 | 9/1965 | Duffy, Jr. . |
| 3,299,232 | 1/1967 | Geppert ...................................... 200/50 |
| 3,299,233 | 1/1967 | Sciba ........................................... 200/50 |
| 3,345,455 | 10/1967 | Goody ....................................... 174/112 |
| 3,384,855 | 5/1968 | Jorgensen et al. . |
| 3,402,254 | 9/1968 | Parker et al. .............................. 174/133 |
| 3,566,331 | 2/1971 | Stanback et al. . |
| 3,657,606 | 4/1972 | Greger et al. ............................. 317/112 |
| 3,710,300 | 1/1973 | Koenig et al. . |
| 3,796,922 | 3/1974 | Mrenna et al. ........................... 317/112 |
| 3,818,417 | 6/1974 | Koenig et al. . |
| 3,852,515 | 12/1974 | Jorgensen et al. ........................ 174/68 |
| 4,146,285 | 3/1979 | Cook . |
| 4,678,253 | 7/1987 | Hicks, Jr. et al. ....................... 439/210 |
| 4,758,536 | 7/1988 | Miller et al. ............................. 439/138 |
| 4,914,549 | 4/1990 | Leone et al. ............................. 361/336 |
| 5,442,135 | 8/1995 | Faulkner et al. ........................ 174/68.2 |
| 5,466,889 | 11/1995 | Faulkner et al. ........................ 174/68.2 |
| 5,486,651 | 1/1996 | Morgan .................................... 174/68.2 |
| 5,619,014 | 4/1997 | Faulkner .................................. 174/68.2 |
| 5,670,743 | 9/1997 | Welch et al. ............................. 174/49 |
| 5,760,339 | 6/1998 | Faulkner et al. ........................ 174/88 |

FOREIGN PATENT DOCUMENTS 257 567 A1  9/1985  German Dem. Rep. .

OTHER PUBLICATIONS

Square D Corporation, Busway Systems Catalog, Oct., 1992, Complete Catalog, particularly pp. 4–6, 9.

Primary Examiner—Renee Luebke
Assistant Examiner—Antoine Ngandjui

[57] ABSTRACT

A low-current busway which includes a busbar spacing compatible with a high-current busway is described. A common bus plug connector for use with a high-current busway and a low-current busway is also described. The low-current busway includes busbars defined by first centerline-to-centerline spacing and a first thickness. The high-current busway includes busbars which include plug-in tabs with a second centerline-to-centerline spacing generally equal to the first spacing. The plug-in tabs are of a second thickness generally equal to the first thickness. The common bus plug connector includes a plurality of conducting fingers spaced at a third centerline-to-centerline spacing generally equal to the first and second spacings.

17 Claims, 10 Drawing Sheets

| BUSBAR WIDTH | BUSBAR THICKNESS: | BUSWAY WIDTH | CURRENT CAPACITY (AMPERES) |
|---|---|---|---|
| 1.75 | 0.29 | 3.9 | 600 |
| 2.38 | 0.29 | 4.5 | 800 |
| 3.25 | 0.29 | 5.4 | 1000 |
| 4.38 | 0.29 | 6.5 | 1200 |
| 5.38 | 0.29 | 7.5 | 1350 |
| 6.50 | 0.29 | 8.6 | 1600 |
| 8.75 | 0.29 | 10.9 | 2000 |
| 5.63 | 0.29 | 13.6 | 2500 |
| 6.75 | 0.29 | 15.8 | 3000 |
| 9.00 | 0.29 | 20.3 | 4000 |

FIG. 3B

| BUSBAR WIDTH | BUSBAR THICKNESS: | BUSWAY WIDTH | CURRENT CAPACITY (AMPERES) |
|---|---|---|---|
| 1.75 | 0.29 | 3.9 | 600 |
| 1.75 | 0.29 | 3.9 | 800 |
| 2.25 | 0.29 | 4.4 | 1000 |
| 2.88 | 0.29 | 5.0 | 1200 |
| 3.50 | 0.29 | 5.6 | 1350 |
| 4.50 | 0.29 | 6.6 | 1600 |
| 6.00 | 0.29 | 8.1 | 2000 |
| 8.50 | 0.29 | 10.6 | 2500 |
| 4.75 | 0.29 | 11.8 | 3000 |
| 6.50 | 0.29 | 15.3 | 4000 |
| 8.50 | 0.29 | 19.3 | 5000 |

| BUSBAR WIDTH | BUSBAR THICKNESS: EDGE SECTIONS | BUSBAR THICKNESS: CENTER SECTION | BUSWAY WIDTH | CURRENT CAPACITY (AMPERES) |
|---|---|---|---|---|
| 0.75 | 0.094 | 0.094 | 2.00 | 100 |
| 0.75 | 0.094 | 0.094 | 2.00 | 160 |
| 0.75 | 0.094 | 0.094 | 2.00 | 225 |
| 0.75 | 0.094 | 0.094 | 2.00 | 250 |
| 1.50 | 0.094 | 0.094 | 2.75 | 315 |
| 1.50 | 0.094 | 0.094 | 2.75 | 400 |
| 2.80 | 0.094 | 0.094 | 4.05 | 500 |
| 2.80 | 0.094 | 0.094 | 4.05 | 600 |
| 2.80 | 0.094 | 0.094 | 4.05 | 630 |
| 4.25 | 0.094 | 0.125 | 5.50 | 800 |

FIG. 5B

| BUSBAR WIDTH | BUSBAR THICKNESS: EDGE SECTIONS | BUSBAR THICKNESS: CENTER SECTION | BUSWAY WIDTH | CURRENT CAPACITY (AMPERES) |
|---|---|---|---|---|
| 0.75 | 0.094 | 0.094 | 2.00 | 100 |
| 0.75 | 0.094 | 0.094 | 2.00 | 160 |
| 0.75 | 0.094 | 0.094 | 2.00 | 225 |
| 1.10 | 0.094 | 0.094 | 2.35 | 250 |
| 2.80 | 0.094 | 0.094 | 4.05 | 315 |
| 2.80 | 0.094 | 0.094 | 4.05 | 400 |
| 4.25 | 0.094 | 0.125 | 5.50 | 600 |
| 4.25 | 0.094 | 0.125 | 5.50 | 630 |

HIGH CURRENT AND LOW CURRENT ELECTRICAL BUSWAY SYSTEMS HAVING COMPATIBLE BUS PLUG

FIELD OF THE INVENTION

The present invention relates generally to improvements in electrical power distribution busways and approaches to interconnecting such busway systems. More specifically, the present invention relates to methods and apparatus for providing a bus plug which is readily interchangeable with both high-amp and low-amp busway systems.

BACKGROUND OF THE INVENTION

Electrical power distribution, or busway, systems are used to distribute electrical power throughout buildings, particularly commercial or industrial type buildings. Generally, a busway includes a number of busway sections which are connected to one another by busway joints. Each busway section includes a housing that encloses a plurality of busbars which may be phase busbars, neutral busbars, or ground busbars depending on the particular application. High-amp busways, generally utilizing larger busbars, are employed for applications requiring current capacity of approximately 600 amperes or higher. For applications requiring less current, typically 100 to 800 amperes, low-amp busways are employed. Due to the lower current capacity requirements, low-amp busbars are generally smaller and do not maintain the same spacing as high-amp busbars.

Machines, lights, tools and other components requiring electricity are provided access to the power conducting busbars at various power tap-off locations disposed along the busway. An opening is typically provided through the housing at each power tap-off location and the conductive material of the busbars is exposed for connection with an appropriate plug connector or bus plug.

A bus plug generally includes an electrical box containing a protective device, such as a circuit breaker, and a disconnect switch. A mechanical connector is provided for mechanically attaching the bus plug to the busway. An electrical connector extends from the bus plug through a window in the busway housing. The connector includes several flat "stab" conductors, or fingers, that make contact with the busbars within the busway. The fingers of the connector must be spaced apart so as to be in registration with the busbars. Due to the differing busbar-to-busbar spacing for typical prior art high-amp and low-amp busways, bus plugs for high-amp systems and for low-amps systems are generally not interchangeable.

Manufacturing and storing different plug connectors for different applications results in increased costs to both manufacturers and purchasers. Accordingly, it would be advantageous if a low-amp busway maintained a busbar-to-busbar spacing compatible with high-amp busways. Additionally, it would be advantageous if a common bus plug connector could be used for highamp and low-amp busways.

SUMMARY OF THE INVENTION

The present invention provides for a common bus plug connector for interchangeable use in both high-amp and low-amp busway systems with busbars which maintain a common centerline-to-centerline distance. Additionally, the present invention provides for a low-amp busway which maintains a busbar centerline-to-centerline distance that is compatible with the busbar centerline-to-centerline spacing of a high-amp busway. Thus, the present invention provides for an electrical power distribution system including a common bus plug connector, a compatible high-amp busway and a compatible low-amp busway.

A more complete understanding of the present invention, as well as further features and advantages, will be apparent from the following Detailed Description and the accompanying drawings.

DETAILED DESCRIPTION

The present invention provides for a common bus plug connector for interchangeable use in both high-amp and low-amp busway systems with busbars which maintain a common centerline-to-centerline distance. Additionally, the present invention includes a low-amp busway which maintains a busbar centerline-to-centerline distance that is compatible with the busbar centerline-to-centerline spacing of a high-amp busway. The present invention now will be described more fully with reference to the accompanying drawings, in which several presently preferred embodiments of the invention are shown. This invention may, however, be embodied in various forms and should not be construed as limited to the embodiments set forth herein. Rather, applicants provide these embodiments so that this disclosure will be thorough and complete, and will fully convey the scope of the invention to those skilled in the art.

Figure 1:
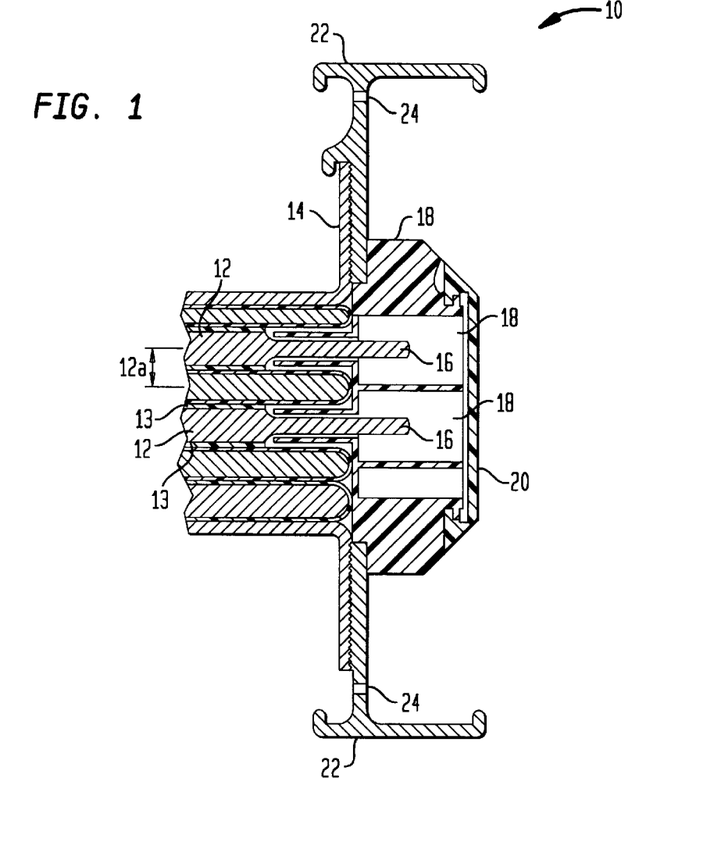
FIG. 1 shows a partial cross-sectional view of a high-amp busway in accordance with the present invention.
Figure 2:
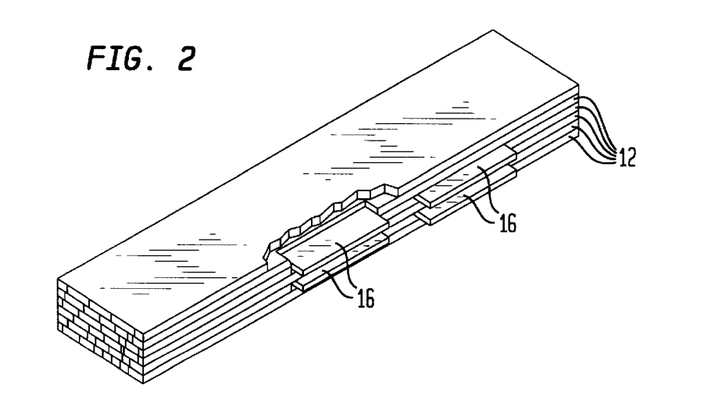
FIG. 2 is a perspective view of a plurality of busbars of the high-amp busway shown in FIG. 1.

FIG. 1 shows a partial cross-sectional view of a high-amp busway 10 which may be advantageously employed in accordance with the methods and overall system of the present invention. The presently preferred high-amp busway 10. is described in greater detail in U.S. Pat. No. 5,442,135 entitled "Electrical Power Distribution Busway and Housing" which is incorporated herein in its entirety. The high-amp busway 10 includes a plurality of busbars 12 disposed within a busway housing 14. Each busbar 12 is coated with an insulative layer 13. The insulative layer 13 on each busbar 12 prevents electrical contact or arcing between the busbars 12. FIG. 2 is a perspective view illustrating the busbars 12 of the high-amp busway 10. In the preferred embodiment, the busbars 12 share a centerline-to-centerline spacing 12a of generally 0.29 inches. Due to varying thicknesses of insulative layer 13, however, the centerline-to-centerline spacing may range from 0.29 inches to 0.35 inches. The busbars 12 include plug-in tabs 16 configured for engagement with a bus plug connector. The plug-in tabs 16 are preferably formed by a coining operation from the conductive material of busbars 12 and have a thickness of approximately 0.094 inches. A insulator assembly 18, which includes a removable door 20, provides access to the plug-in tabs 16 through a plurality of openings 18. Additionally, the plug-in tabs 16 maintain the same centerline-to-centerline spacing 12a of approximately 0.29 inches as the busbars 12. As seen in FIG. 1, the housing 14 includes a plurality of slots 24 and upper and lower flanges 22 which provide a structure for the common bus plug connector (described below) to connect.

Figure 3A:
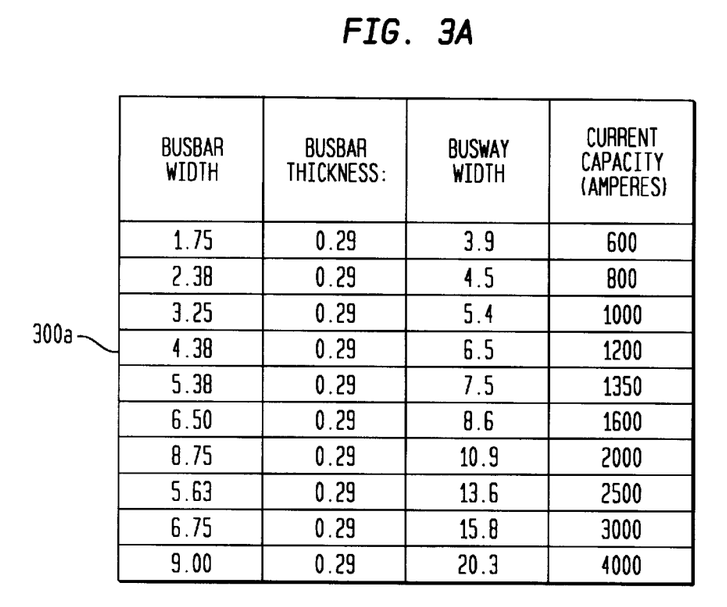
FIG. 3A is a table which lists the busway widths, busbar widths, busbar thicknesses and maximum current capacity for aluminum composition busbars for a first alternative embodiment of the busway shown in FIG. 1.
Figure 3B:
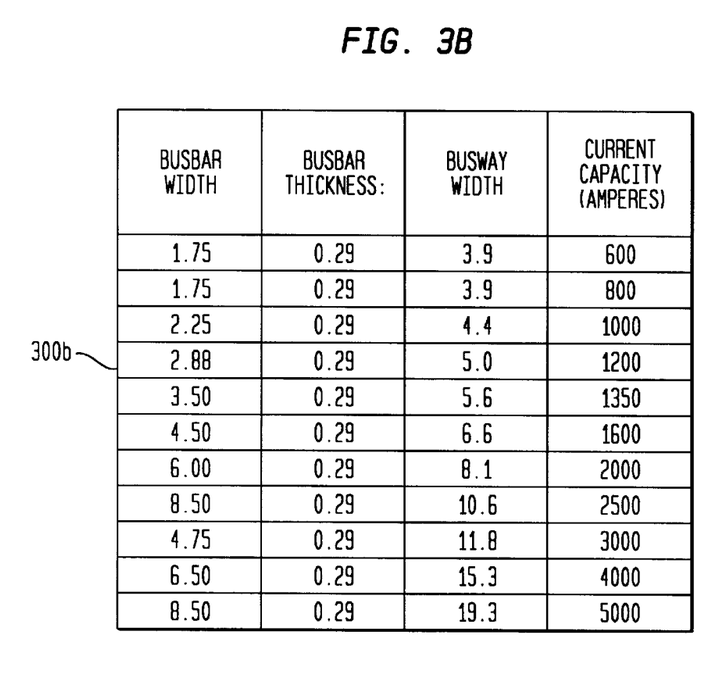
FIG. 3B is a table which lists the busway widths, busbar widths, busbar thicknesses and maximum current capacity for copper composition busbars for a second alternative embodiment of the busway shown in FIG. 1.

As shown in FIGS. 3A and 3B, a series of busway 10 and busbar 12 widths corresponding to a series of maximum amperage ratings can be manufactured in order to provide varying current capacity requirements. FIG. 3A shows a Table 300A which lists the busway widths, busbar widths, busbar thicknesses and maximum current capacity for aluminum composition busbars 12 for alternative embodiments of busway 10 in accordance with the present invention. FIG. 3B shows a Table 300B which lists the busway widths, busbar widths, busbar thicknesses and maximum current capacity for copper composition busbars 12 for alternative embodiments of busway 10 in accordance with the present invention. All of the alternative embodiments of the high-amp busway 10 include the upper and lower flanges 22.

Figure 4A:
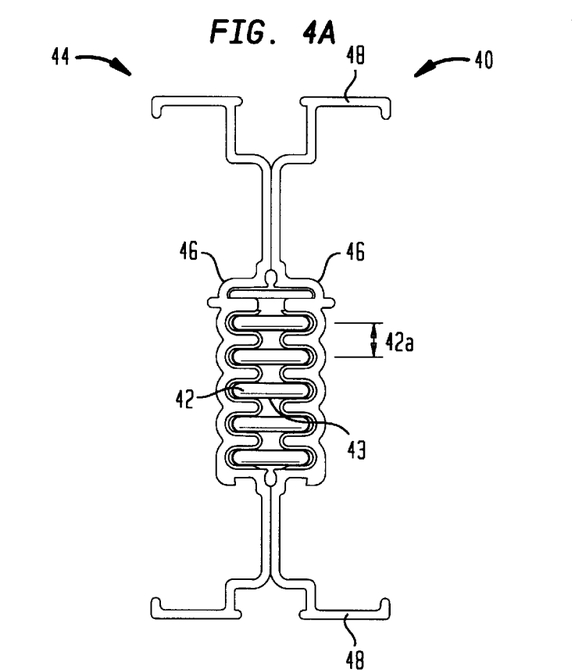
FIG. 4A shows a cross-sectional view of a low-amp busway in accordance with the present invention.

FIG. 4A shows a cross-sectional view of a low-amp busway 40 in accordance with the present invention. The presently preferred low-amp busway 40 is described in greater detail in U.S. patent application Ser. No. 09/165,758 filed on the same date as the present application, entitled "An Electrical Power Distribution Busway Having A Two-Piece Housing" which is incorporated by reference herein in its entirety. A plurality of low-amp busbars 42 are horizontally contained within a busway housing 44 in a spaced-apart relationship. The busbars 42 are coated with an insulating layer 43 to prevent arcing between the busbars 42. In the preferred embodiment, the insulating layer 43 is an epoxy insulation applied via an electrostatic spray process. A pair of vertical side channels 46 are joined to form the busway housing 44. The busbars 42 are spaced apart at a predetermined centerline-to-centerline distance 42a approximately corresponding to the centerline-to-centerline distance 12a of the high-amp busbars 12. In the preferred embodiment of the present invention, the centerline-to-centerline distance 42a is approximately 0.32 inches. Additionally, the busbars 42 are of generally the same thickness, 0.094 inches, as the plug-in tabs 16, allowing a common bus plug connector (described below) to connect to both the plug-in tabs 16 and the busbars 42. The housing 44 includes a plurality of slots 58 (shown in FIG. 6) and upper and lower flanges 48 which provide a structure for the common bus plug connector to connect.

Figure 4B:
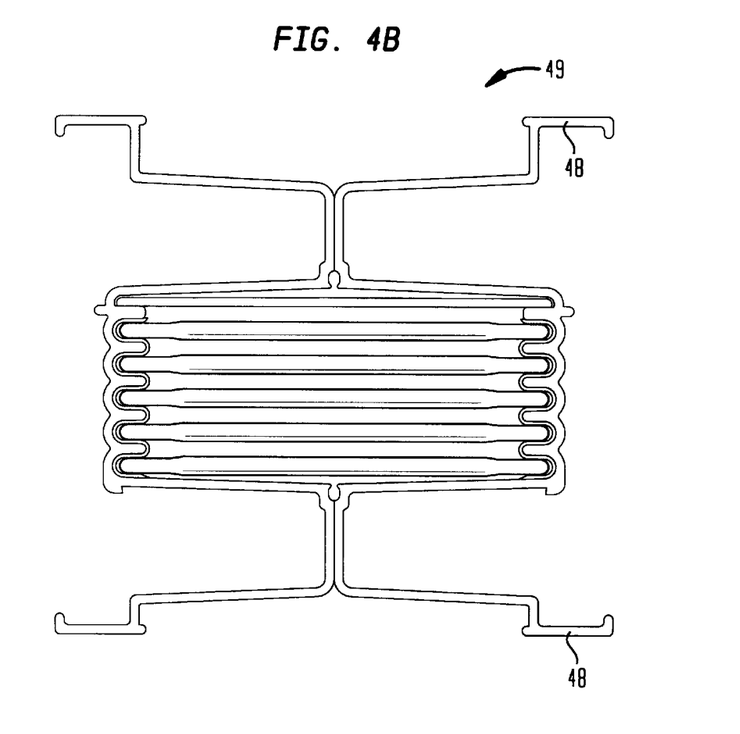
FIG. 4B shows a cross-sectional view of an alternative embodiment of a low-amp busway in accordance with the present invention.
Figure 5A:
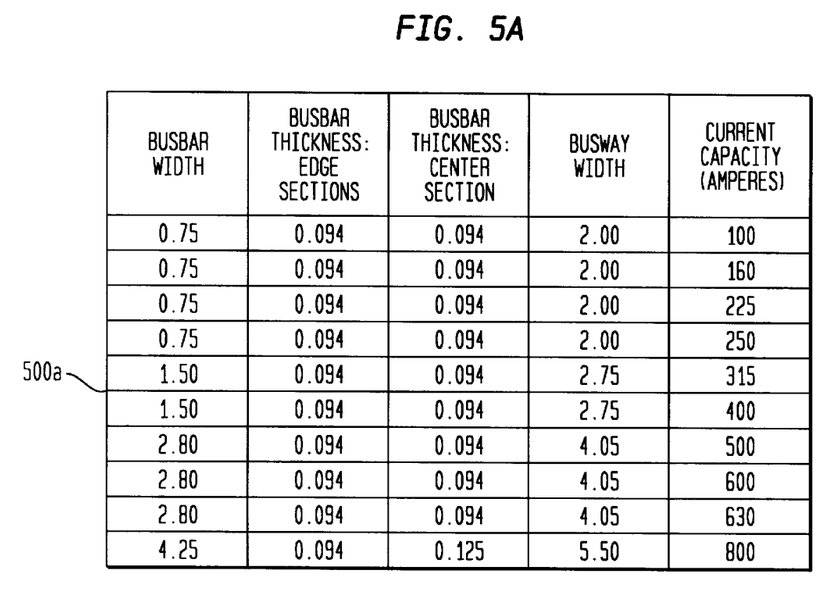
FIG. 5A is a table which lists the busway widths, busbar widths, busbar thicknesses and maximum current capacity for copper composition busbars for a first alternative embodiment of a low-amp busway in accordance with the present invention.
Figure 5B:
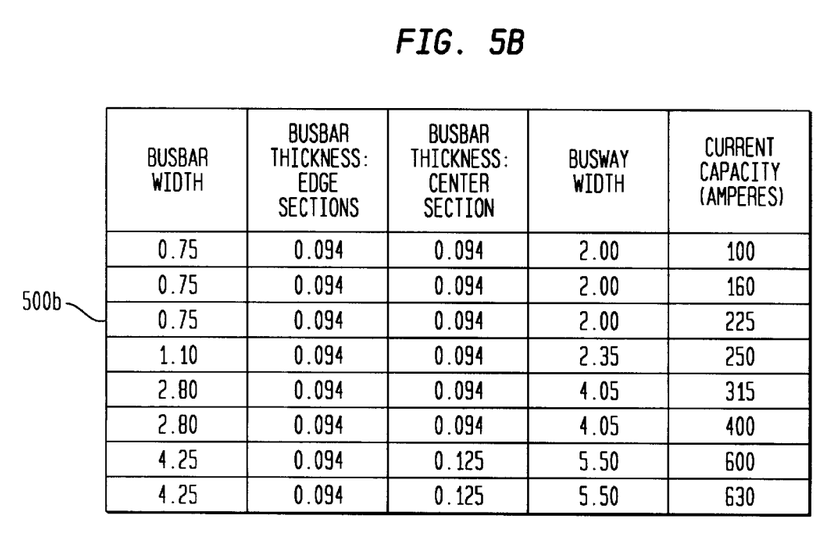
FIG. 5B is a table which lists the busway widths, busbar widths, busbar thicknesses and maximum current capacity for aluminum composition busbars for a second alternative embodiment of a low-amp busway in accordance with the present invention.

FIG. 4B shows an alternative embodiment of a low-amp busway 49 in accordance with the present invention. As shown in FIGS. 5A and 5B, a series of busway 40 and busbar 42 widths corresponding to a series of maximum amperage ratings can be manufactured in order to provide varying current capacity requirements. FIG. 5A shows a Table 500A which lists the busway widths, busbar widths, busbar thicknesses and maximum current capacity for copper composition busbars 12 for alternative embodiments of busway 10 in accordance with the present invention. FIG. 5B shows a Table 500B which lists the busway widths, busbar widths, busbar thicknesses and maximum current capacity for aluminum composition busbars 12 for alternative embodiments of busway 10 in accordance with the present invention. All of the alternative embodiments of the high-amp busway include the upper and lower flanges 48.

Figure 6:
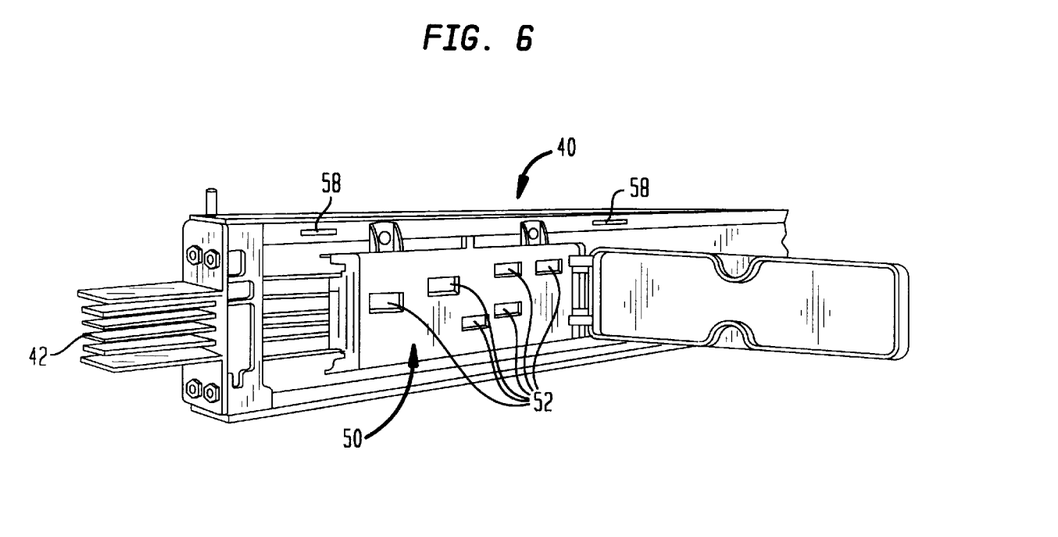
FIG. 6 is a perspective view of the low-amp busway of FIG. 4A.

FIG. 6 shows a perspective view of the low-amp busway 40. A door assembly 50 is attached to the busway housing. The presently preferred door assembly 50 is described in greater detail in U.S. patent application Ser. No. 09/165,696, entitled "Dual-Hinged Door For An Electrical Power Distribution Busway", which is incorporated by reference herein in its entirety. Door assembly 50 includes a plurality of slots 52 which provide access to the busbars 42 contained within low-amp busway 40. While a presently preferred door assembly is described herein, it will be recognized that other suitable mechanisms may be employed to provide access for connection to the busbars 42.

Figure 7:
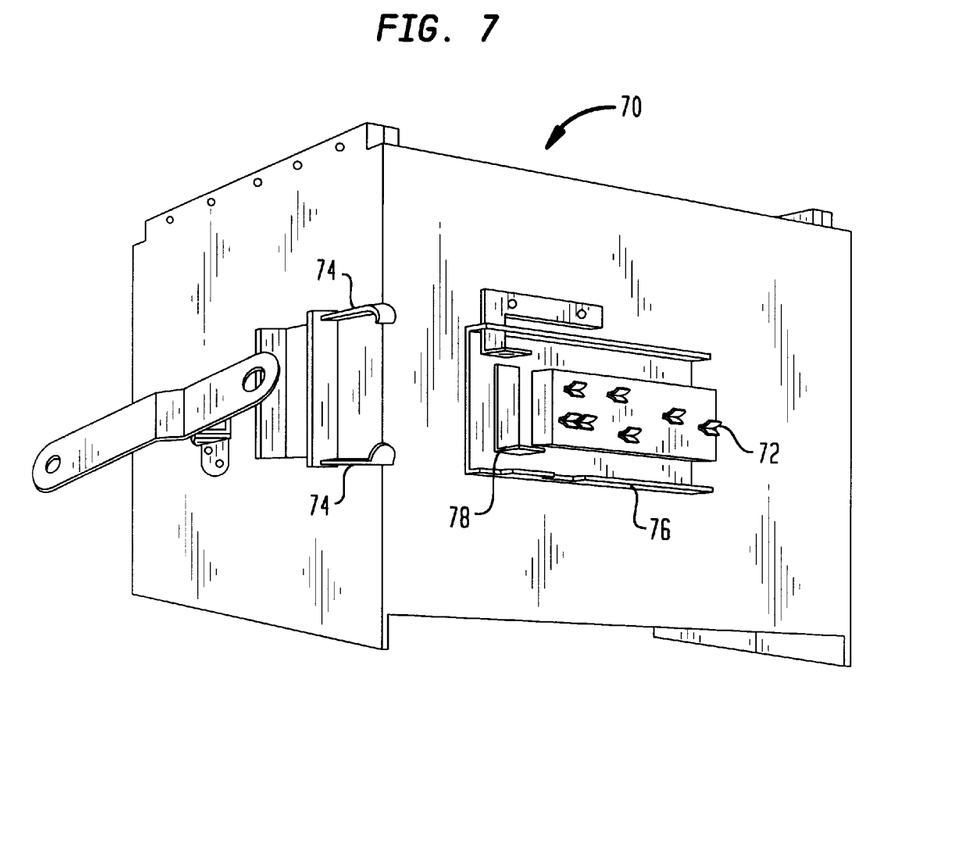
FIG. 7 is a perspective view of a common bus plug in accordance with the present invention.
Figure 9:
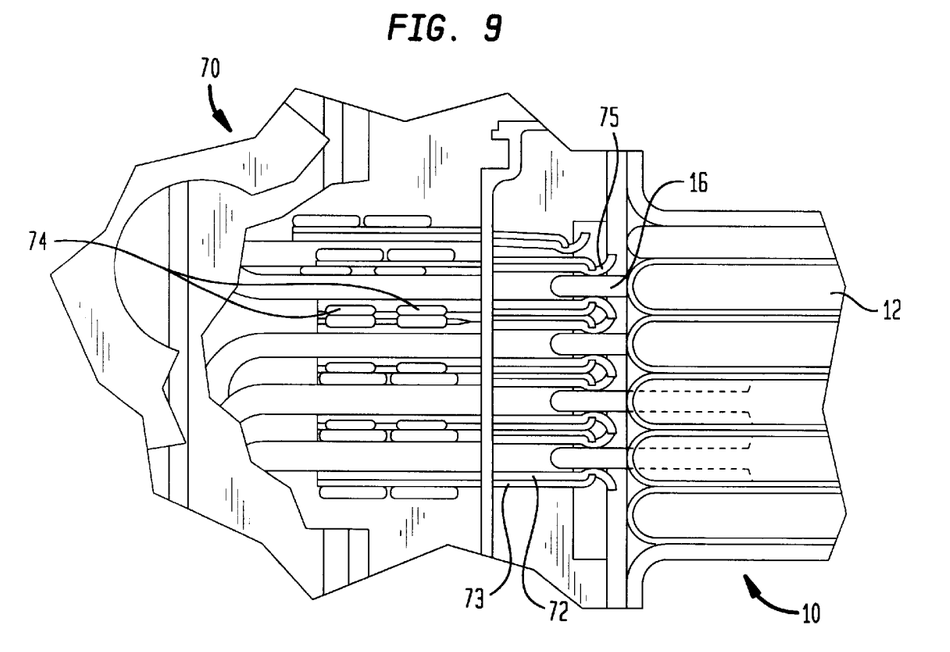
FIG. 9 is a detail view of the fingers of FIG. 8.

FIG. 7 shows a perspective view of a common, or interchangeable, bus plug 70 in accordance with the present invention. The presently preferred bus plug 70 is described in greater detail in U.S. patent application Ser. No. 09/165,690, now U.S. Pat. No. 6,023,030, filed on the same date as the present application, entitled "Bus Plug Door Interlock" which is incorporated by reference herein in its entirety. The bus plug 70 includes a plurality of conductive fingers 72 for connecting to the plug-in tabs 16 of high-amp busway 10 and the busbars 42 of low-amp busway 40. In the preferred embodiment, the fingers 72 are composed of copper. As seen in FIG. 9, each finger 72 is held in place by a steel tension member 73 which is connected to the finger 72 by a pair of rivets 74. The tension members 73 force each finger 72 to maintain contact with an opposing finger 72 when the bus plug 70 is not connected to the busway. The finger ends 75 are arc-shaped to provide a lead-in to facilitate connection to the busbars 12 and plug-in tabs 16. Each finger 72 is of appropriate thickness to allow for flow of electrical current and to fit within the slots 52 and the openings 18. Each pair of conductive fingers 72 is spaced apart at a predetermined distance of 0.32 inches, generally corresponding to the centerline-to-centerline distance of the high-amp busbars. In other words, the pairs of conductive fingers 72, the high-amp busbars 12 and low-amp busbars 42 maintain approximately the same centerline-to-centerline spacing.

The bus plug 70 includes a pair of mounting hooks 74 disposed on opposite sides of the bus plug 70. The mounting hooks 74 are adapted to attach to the flanges 22 of the high-amp busway 10 and the flanges 48 of the low-amp busway 40. A support rail assembly 76 provides a generally U-shaped structure to enclose the housing 44 of the low-amp busway 40 and the housing 14 of the high-amp busway 10. An interlock stab assembly 78 is disposed on the bus plug adjacent to the support rail assembly 76.

Figure 8:
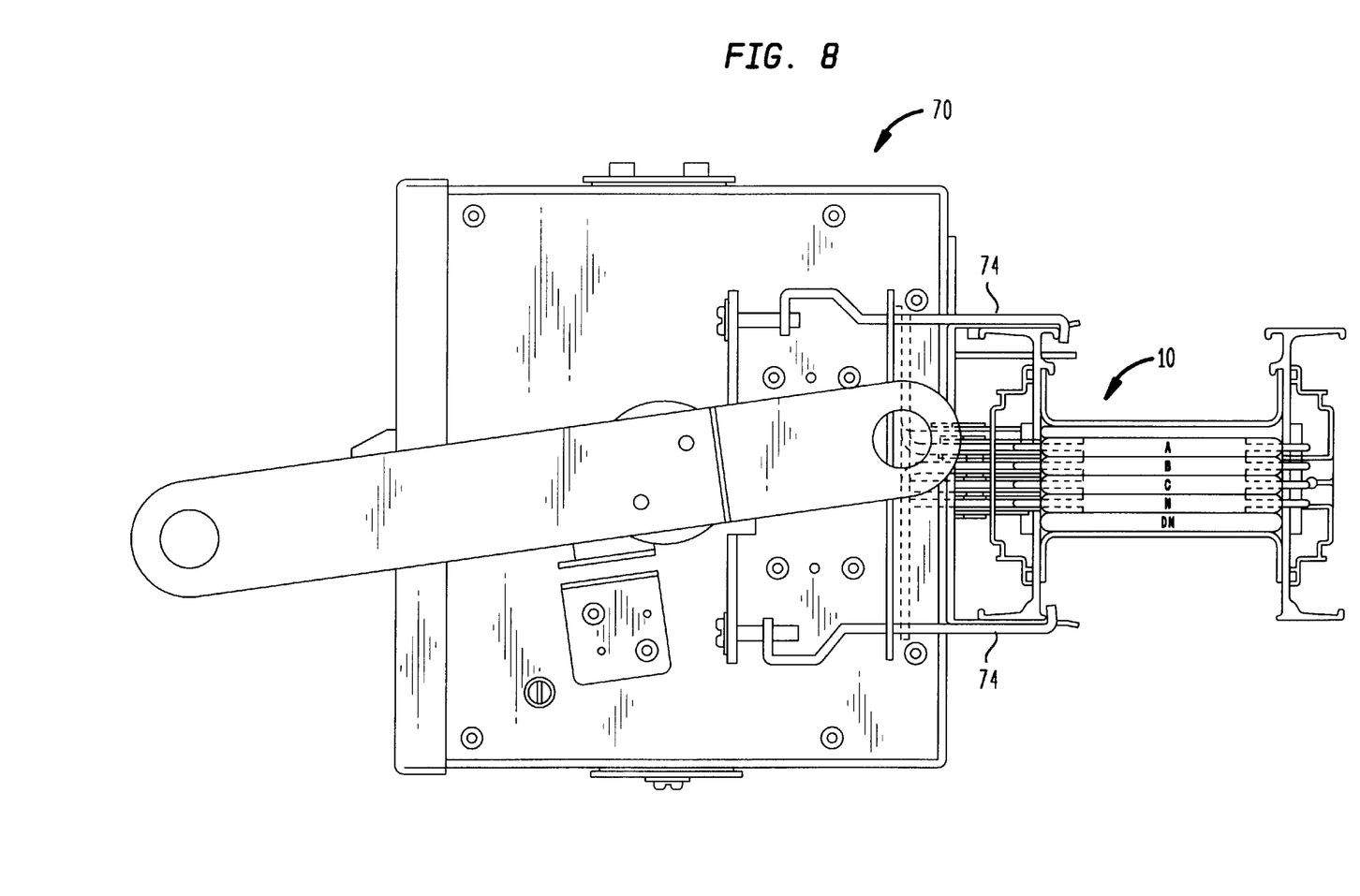
FIG. 8 is an end view of the high-amp busway of FIG. 1 connected to the common bus plug of FIG. 7 in accordance with the present invention.

FIG. 8 is an end view of the high amp busway 10 connected to the common bus plug 70 in accordance with the present invention. The bus plug 70 engages the housing 14 of the high-amp busway 10 and is locked into place by the interlock stab assembly 78 engaging the slots 24. Additionally, the mounting hooks 74 lock onto the flanges 22. As best seen in FIG. 9, the conductive fingers 72 engage the busbar plug-in tabs 16, providing an electrical connection for current to flow. Each busbar plug-in tab 16 is disposed between a pair of conductive fingers 72.

Figure 10:
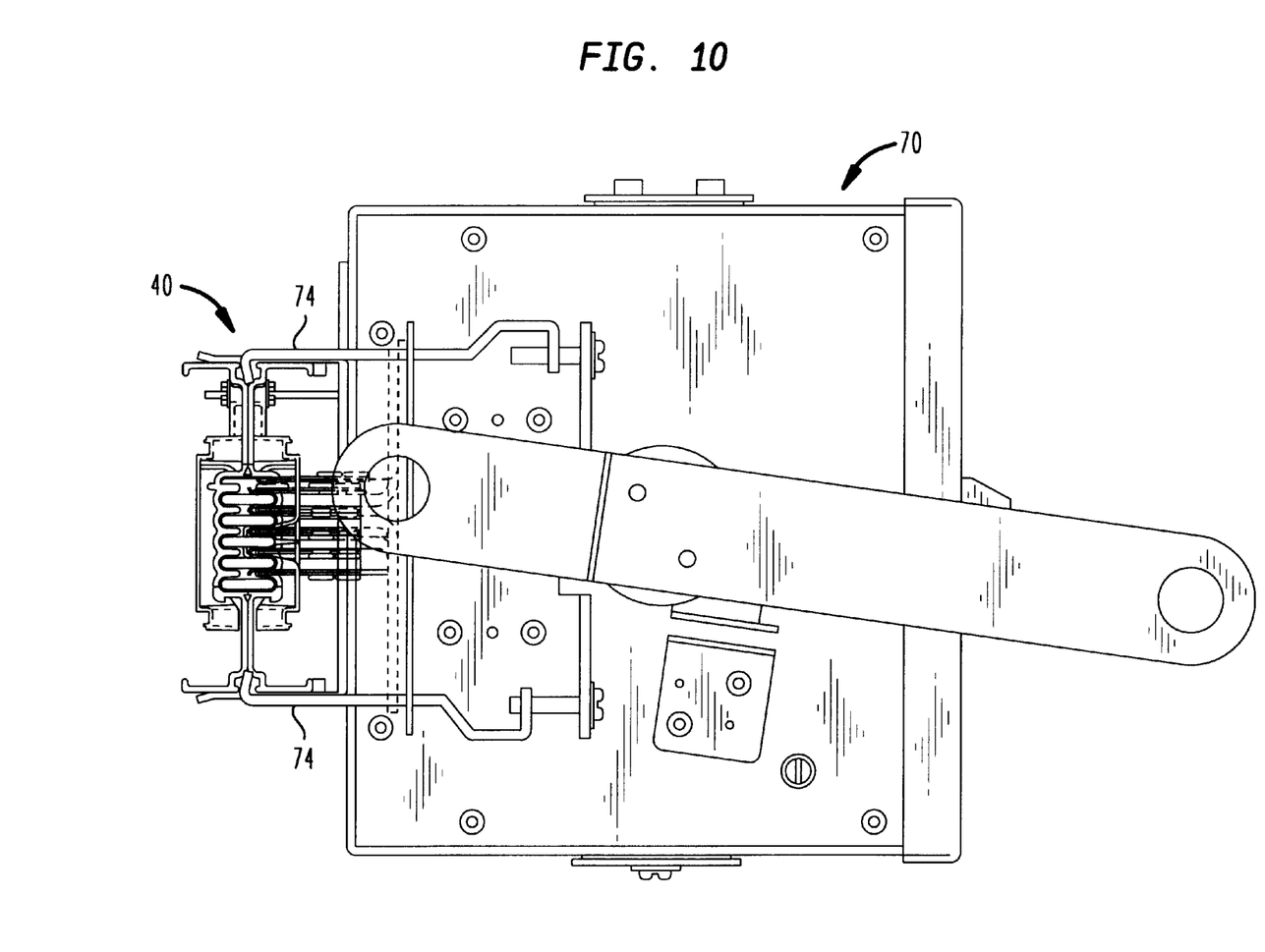
FIG. 10 is an end view of the low-amp busway of FIG. 4A connected to the common bus plug of FIG. 7 in accordance with the present invention.
Figure 11:
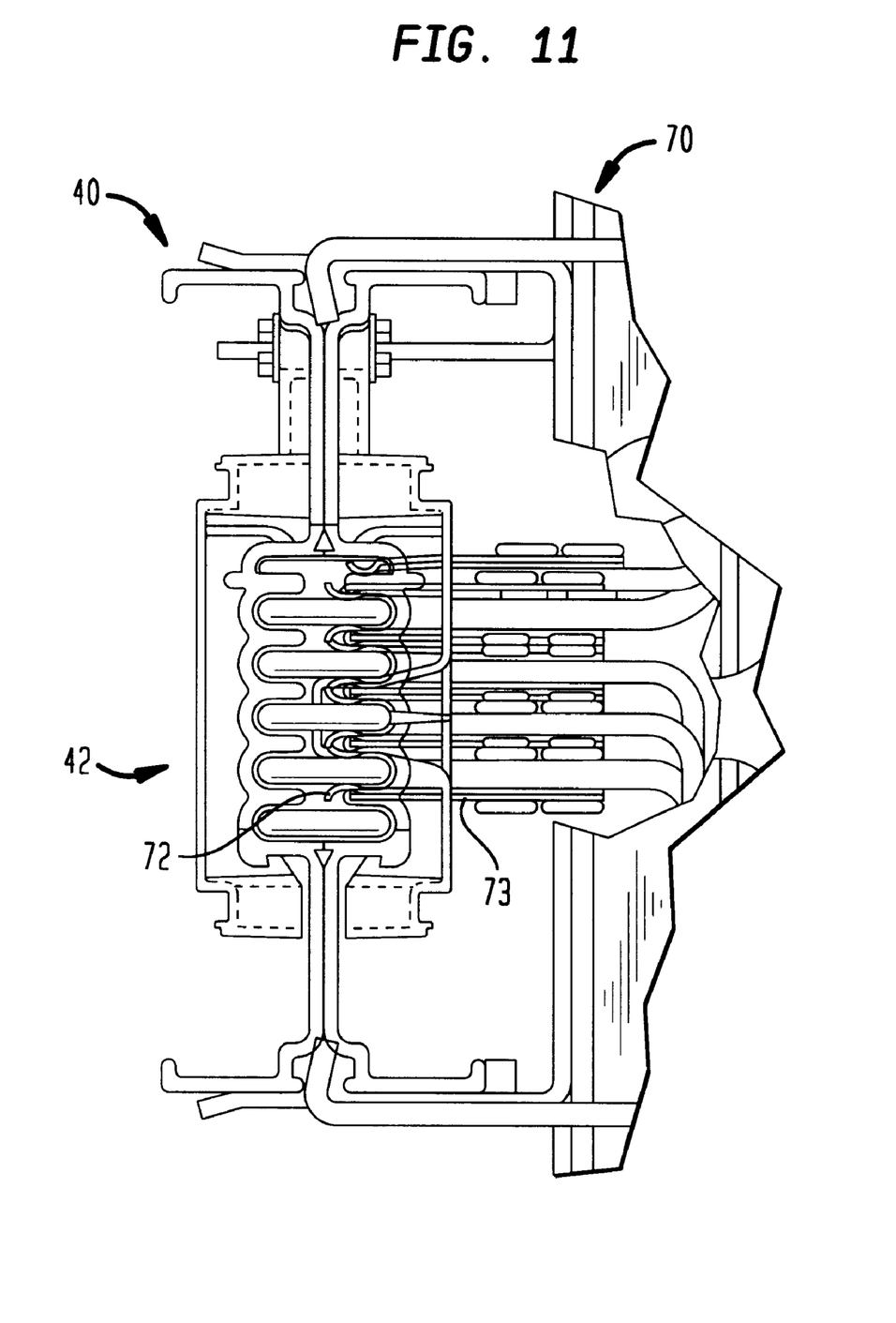
FIG. 11 is a detail view of the fingers of FIG. 10.

FIG. 10 is an end view of the low-amp busway 40 connected to the common bus plug 70 in accordance with the present invention. The bus plug 70 engages the housing 44 of the high-amp busway 40 and is locked into place by the interlock stab assembly 78 engaging the slots 58. Additionally, the mounting hooks 74 lock onto the flanges 48. As best seen in FIG. 11, the conductive fingers 72 engage the busbars 42, providing an electrical connection for current to flow. Each busbar 42 is disposed between a pair of conductive fingers 72. As described above, each finger 72 is held in place by a tension member 73 which forces the finger to maintain contact with the busbar 42.

I claim:

1. A bus plug connector for use in conjunction with a high amperage electrical power distribution busway and a low amperage electrical power distribution busway, the high amperage electrical power distribution busway having a first plurality of busbars having a first thickness and having centerlines having a first predetermined spacing with each of the plurality of busbars having a tab for connection to the bus plug, the tab being of a second predetermined thickness less than the first predetermined thickness of the first plurality of busbars, the low amperage electrical power distribution busway having a second plurality of conductive busbars in a spaced-apart relationship with centerlines having substantially the first predetermined spacing and having edges of substantially the second predetermined thickness, the bus plug connector including a plurality of pairs of conducting fingers having centerlines with substantially the first predetermined spacing, each finger pair adapted to open to the second predetermined thickness; whereby the fingers can engage the plurality of tabs or the edges of the second plurality of busbars.

2. The bus plug connector of claim 1, wherein a surface of at least one of the first plurality of conductive busbars is covered by an electrically insulating layer, further comprising:
   a high-amperage busway housing, the high-amperage busway housing adapted to hold the insulating layers of adjacent busbars in contact, the high-amperage busway housing including a pair of side plates and a housing channel mounted between the pair of side plates at a fixed location.

3. The bus plug connector of claim 1 further comprising:
   a housing, the plurality of fingers protruding through a first wall of the housing;
   an electrical switch mounted within the housing and electrically connected to the conducting fingers; and
   a handle mounted on a second exterior wall of the housing, the handle mechanically connected to electrical switch.

4. The bus plug connector of claim 3 further comprising:
   at least one clamping member disposed on the housing for clamping the housing to a busway, each clamping member adapted for engagement with both the low amperage electrical power distribution busway and the high amperage electrical power distribution busway.

5. The bus plug connector of claim 3, further comprising:
   a stab assembly disposed on the first wall of the housing, the stab assembly adapted for engagement with both the low amperage electrical power distribution busway and the high amperage electrical power distribution busway.

6. The bus plug connector of claim 3, wherein a surface of at least one of the first plurality of conductive busbars is covered by an electrically insulating material.

7. A low amperage electrical power distribution busway especially adapted for use with a common bus plug connector for use in conjunction with both the low amperage electrical power distribution busway and a high amperage electrical power distribution busway having a first plurality of busbars having centerlines having a first predetermined spacing with each of the plurality of busbars having a first predetermined thickness and having a tab for connection to the common bus plug, said tab of a second predetermined thickness less than the first predetermined thickness of the first plurality of busbars, the low amperage electrical power distribution busway comprising:
   a second plurality of conductive busbars having edges substantially of the second predetermined thickness; and
   a housing for supporting the second plurality of conductive busbars and maintaining the second plurality of conductive busbars in a spaced-apart relationship with their centerlines having substantially the first predetermined spacing.

8. The busway of claim 7, wherein the second plurality of conductive busbars includes center sections of a third predetermined thickness greater than the second predetermined thickness.

9. The busway of claim 7, wherein the second predetermined thickness is approximately 0.094 inches and the first predetermined spacing is approximately 0.32 inches.

10. The busway of claim 7 wherein:
    the low amperage electrical power distribution busway has an amperage rating less than or equal to 800 amperes; and
    the high amperage electrical power distribution busway has an amperage rating greater than 600 amperes.

11. An electrical power distribution system comprising a low amperage electrical power distribution busway including a plurality of low amperage busbars, a high amperage electrical power distribution busway including a plurality of high amperage busbars and a common bus plug connector for use in conjunction with the low amperage electrical power distribution busway and the high amperage electrical power distribution busway, the common bus plug connector having a connection mechanism for connecting to either the plurality of low amperage busbars or the plurality of high amperage busbars.

12. The electrical power distribution system of claim 11 wherein:
    the low amperage electrical power distribution busway includes a series of amperage ratings where the lowest amperage rating is 100 amperes and the highest amperage rating is 800 amperes; and
    the high amperage electrical power distribution busway includes a series of amperage ratings where the lowest amperage rating is 600 amperes and the highest amperage rating is 5000 amperes.

13. A bus plug connector for use in conjunction with a high amperage electrical power distribution busway and a low amperage electrical power distribution busway, the high amperage electrical power distribution busway having a first plurality of busbars having edges of a predetermined thickness and having centerlines having a predetermined spacing, the low amperage electrical power distribution busway having a second plurality of conductive busbars in a spaced-apart relationship having edges of the predetermined thickness and having centerlines having substantially the predetermined spacing, the bus plug connector including a plurality of conducting fingers with their centerlines having substantially the predetermined spacing, each finger pair adapted to open to the predetermined thickness whereby the fingers can engage the first plurality of busbars and the second plurality of busbars.

14. The bus plug connector of claim 13 wherein:

the low amperage electrical power distribution busway has an amperage rating between 100 amperes and 800 amperes; and the high amperage electrical power distribution busway has an amperage rating between 600 amperes and 5000 amperes.

15. An electrical power distribution system comprising a low amperage electrical power distribution busway and a high amperage electrical power distribution busway, the high amperage electrical power distribution busway having a first plurality of busbars having edges of a predetermined thickness and having centerlines having a predetermined spacing, the low amperage electrical power distribution busway having a second plurality of conductive busbars in a spaced-apart relationship having edges of the predetermined thickness and having centerlines having substantially the predetermined spacing.

16. The electrical power distribution system of claim 15 wherein:

the low amperage electrical power distribution busway includes a series of amperage ratings where the lowest amperage rating is 100 amperes and the highest amperage rating is 800 amperes; and the high amperage electrical power distribution busway includes a series of amperage ratings where the lowest amperage rating is 600 amperes and the highest amperage rating is 5000 amperes.

17. The electrical power distribution system of claim 15, wherein the first plurality of busbars have a second thickness greater than the predetermined the predetermined thickness, and have tabs near the edges having the predetermined thickness.

* * * * *